Feb. 12, 1952   J. D. EISLER ET AL   2,585,377
BALANCED ELECTRONIC INVERTER
Filed Sept. 3, 1948   2 SHEETS—SHEET 1

INVENTORS:
JOSEPH D. EISLER
RALPH E. HARTLINE
BY Newell Pottof
ATTORNEY

Feb. 12, 1952     J. D. EISLER ET AL     2,585,377
BALANCED ELECTRONIC INVERTER

Filed Sept. 3, 1948     2 SHEETS—SHEET 2

*INVENTORS:*
JOSEPH D. EISLER
RALPH E. HARTLINE
BY Newell Pottorf
ATTORNEY

Patented Feb. 12, 1952

2,585,377

UNITED STATES PATENT OFFICE 2,585,377

BALANCED ELECTRONIC INVERTER

Joseph D. Eisler and Ralph E. Hartline, Tulsa, Okla., assignors to Stanolind Oil and Gas Company, Tulsa, Okla., a corporation of Delaware Application September 3, 1948, Serial No. 47,742

2 Claims. (Cl. 250—27)

This invention relates to the logging of wells and is directed particularly to an apparatus for logging simultaneously the alternating-current resistivity of well formations and the direct-current spontaneous potential.

In the electrical logging of wells it has become a common practice to make a resistivity log by passing alternating current through the earth between a surface and a well electrode and measuring the potential drop of this current between a pair of electrodes spaced from the current electrode in the well. Alternating current is preferred for the reason that metallic electrodes may be employed without difficulties due to contact potential between the electrode metal and the well fluids or to polarization of the electrodes. Also, systems for amplifying and recording the amplitude or phase of alternating-current potentials are well known and have very satisfactory stability.

Because of the additional information provided by a spontaneous or self-potential log, it is very often recorded simultaneously with the recording of the alternating-current resistivity log. Ordinarily this is made possible by two channels of recording apparatus, one of which is responsive only to alternating-current voltages, while the other responds only to direct-current voltages.

For the recording of alternating-current potentials (i. e., the resistivity log) we have now devised a very stable and highly sensitive alternating-current-operated pen-recording mechanism. Essentially this device comprises a phase-sensitive amplifier for alternating current, which drives a small servo-motor which in turn actuates an inking pen. The pen moves in a rectilinear fashion across a record chart which is simultaneously driven in a direction perpendicular to the motion of the pen and in proportion to the depth of the well electrode array. The servo-mechanism in particular has a high speed of response, being capable of moving the recording pen throughout its entire range of travel in about 0.3 second. The system as a whole has a substantially flat response for frequencies from 0 up to 2 or 2½ cycles per second and is, therefore, more than adequate for recording even the most rapid signal variations encountered during well logging operations.

Having available a recorder of such satisfactory characteristics for well logging, the problem has arisen of how to convert the direct-current spontaneous potentials to alternating current voltages which the recorder is adapted to amplify and record. It has been found that commutating means, which simply interrupt the direct-current potential at a frequency to which the alternating-current recorder responds are sensitive both to changes in frequency and amplitude of the alternating-current power source. Erroneous indications are therefore possible because of the lack of stability of the portable power sources commonly used.

It is, accordingly, a primary object of our invention to provide a novel and improved apparatus for simultaneously recording resistivity and spontaneous-potential well logs, using alternating-current recording channels. Another object is to provide, in an alternating-current well-logging system, means for converting direct-current spontaneous potentials to alternating voltages suitable for recording by an alternating-current recorder channel. A further object is to provide a direct-current to alternating-current inverter which is sensitive to small direct-current potentials and linear in response over a wide range of voltages. A still further object is to provide a direct-current to alternating-current inverter which is relatively insensitive to changes in amplitude and frequency of the alternating-current power supply. Still another object is to provide a means for converting direct-current voltages to alternating-current voltages, which means has a relatively high input impedance. A still further object is to provide a converter of direct to alternating potentials which has substantially zero response for zero direct-current input and reverses the alternating-current phase with reversal of the direct-current polarity. Other objects, uses, and advantages of our invention will become apparent as the description proceeds.

Briefly stated, the foregoing and other objects of our invention are accomplished by a balanced vacuum-tube inverter circuit in which the direct-current potential to be converted is applied to the control grids of a pair of vacuum tubes for which the plate voltage is supplied from the available alternating-current power source. The resultant alternating current flowing in the cathode circuits of the tubes is the desired alternating-current output. Balancing of the residual alternating current flowing in the tube cathode circuits when the direct current input voltage is zero is provided by a second pair of vacuum tubes of similar characteristics to the first tubes but connected in phase opposition and supplied with constant grid voltage. The balance achieved is thus true not only for amplitude and phase, but also for the wave form of the current flowing in the cathode circuits of the first pair of tubes.

These principles and the operation of our invention will be more easily understood by referring to the accompanying drawings, in which the same reference numerals are applied to the same or corresponding parts in the different figures.

In these drawings.

Figure 1:
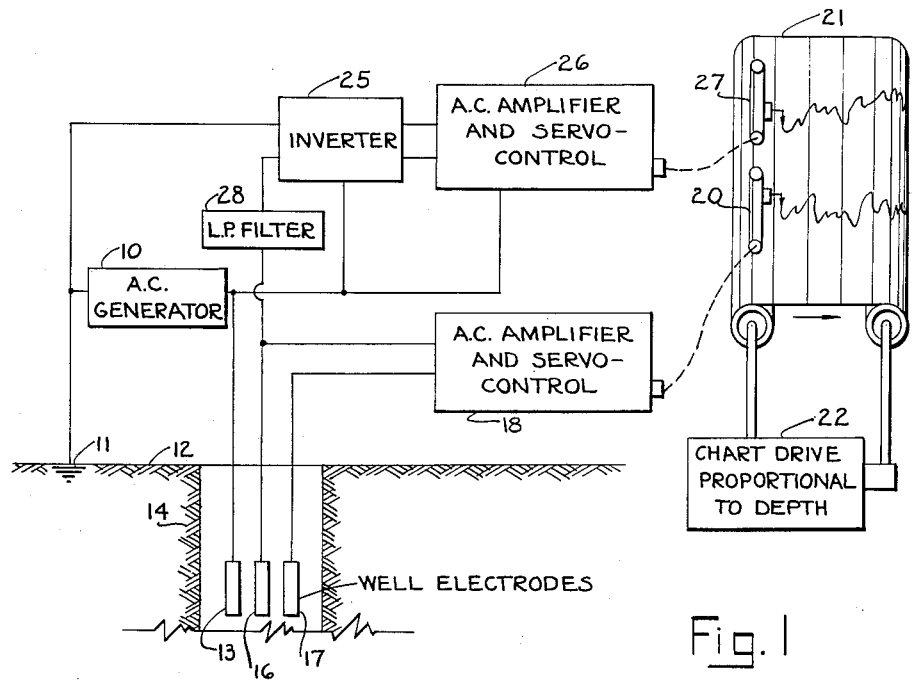
Figure 1 is a circuit diagram in block form of a complete electrical well-logging system embodying our invention.

Referring now particularly to Figure 1, a portable alternating-current generator 10 providing, for example, a 110-volt, 60-cycle output is connected by suitable insulated leads to a grounded electrode 11 at the surface of the earth 12 and to an electrode 13 adapted to be passed through a well 14 which is to be logged. Also situated within well 14, and disposed in any desired manner with respect to current electrode 13, are a pair of potential electrodes 16 and 17 connected by suitable electrically-insulated leads to an alternating-current amplifier and servo-control channel 18 at the surface. A record of the alternating-current potential between electrodes 16 and 17 is made by a movable pen 20 on a chart 21 which is moved in accordance with the depth of the well electrodes by a driving means 22 well known in the logging art, pen 20 being actuated by the servo-motor of amplifier and servo-control 18.

Simultaneously with this recording of alternating-current potential, recording of the direct-current potential difference between the surface electrode 11 and one of the well electrodes, for example electrode 16, is accomplished by an inverter 25 which converts this direct-current potential to a suitable alternating-current voltage which is amplified and recorded by a second channel 26 of the same type as amplifier and servo-control 18, and which similarly actuates a second recording pen 27 contacting the chart 21. A low-pass filter 28 interposed in the input circuit to inverter 25 effectively excludes alternating-current voltages and passes only the direct-current voltage to be recorded.

Figure 2:
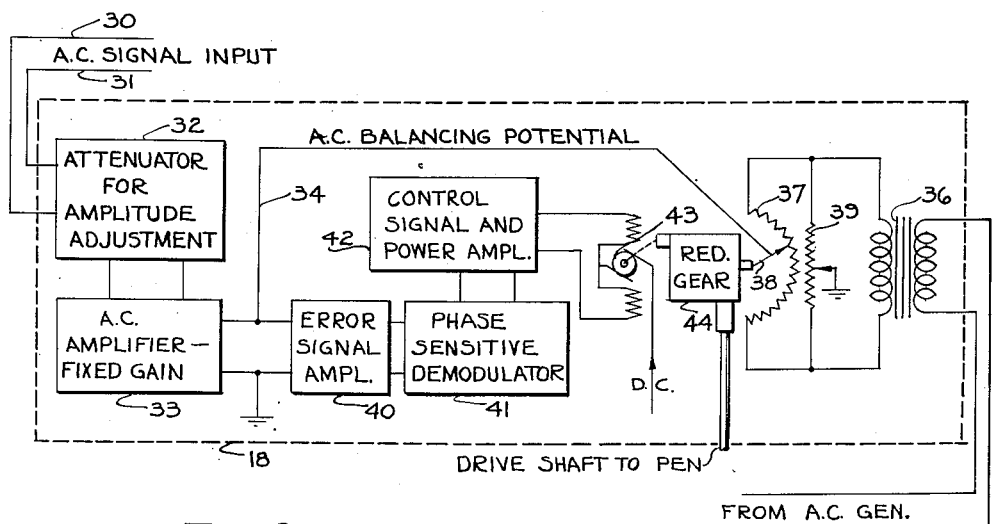
Figure 2 is a circuit diagram in block form of one of the alternating-current recording channels employed in our well-logging system.

The details and operation of one of the amplifier and servo-control channels 18 (or 26) may be better understood by referring to Figure 2. The alternating-current signal to be recorded, appearing across the input leads 30 and 31, is first applied to an attenuator circuit 32 which gives the signal variations a range suitable for the available chart width. The signal thus attenuated by a known factor is amplified by a fixed-gain amplifier 33, and the output of this amplifier is balanced against an adjustable alternating balancing potential applied over a lead 34.

This balancing potential is obtained from the alternating-current generator 10 through a transformer 36, the secondary of which is connected across a potentiometer resistor 37 contacted by a slider 38 which is adjusted in a manner to be described. In parallel with resistor 37 is a second potentiometer 39, the slider of which is grounded.

Being 180° out of phase, when the output of amplifier 33 and the balancing potential applied over lead 34 are of different amplitude, there is a differential or error-voltage which is amplified by an amplifier 40 and demodulated by a phase-sensitive demodulator 41, to produce a direct-current voltage which changes polarity depending upon the phase of the error signal from amplifier 40. The demodulated signal is suitably amplified by an amplifier 42, having an output of sufficient power to operate a reversible servo-motor 43 which through suitable reduction gearing 44 drives one of the recording pens 20 (or 27) and simultaneously adjusts the position of slider 38 on potentiometer resistor 37.

It will be seen that this comprises essentially an automatic or self-balancing system. As the demodulator 41 recognizes the phase of the differential or error voltage, which depends only on the direction of unbalance of the system, reversible motor 43 can always be energized in the proper sense to restore the balance and reduce the error voltage to zero. By making potentiometer 37 linear with slider position, the displacement of pen 20 or 27 will be similarly linear with respect to the input signal applied over the leads 30 and 31.

Adjustment of the slider of potentiometer 39 will cause a similar shift in position of slider 38 to maintain the system in balance for zero input. Potentiometer 39 thus serves as a convenient means of varying the zero position of pen 20 or 27 on chart 21 without in any way affecting the linearity, sensitivity, or accuracy of balancing of the system.

Figure 3:
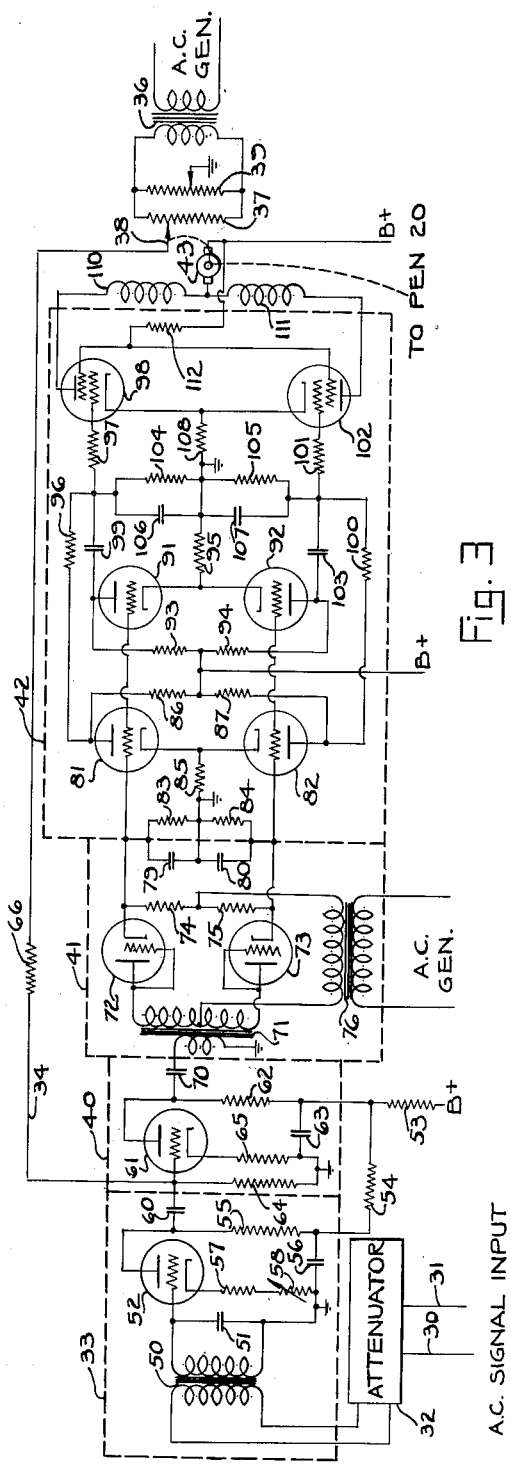
Figure 3 is a detailed circuit diagram of the alternating-current recording channel of Figure 2.

A typical channel of this alternating-current recorder is shown in further detail in Figure 3. The amplifier 33 which follows attenuator 32 is provided with a matching input transformer 50, the secondary of which is tuned by a condenser 51 and connected between ground and the control grid of a triode 52. Plate voltage is supplied to triode 52 through the network comprising the decoupling resistors 53 and 54, a plate load resistor 55 and a decoupling condenser 56. The cathode circuit of triode 52 comprises a fixed cathode-bias resistance 57 in series with an adjustable cathode-bias resistance 58. When a calibrating signal of known amplitude is applied to the channel input, bias resistor 58 is varied to produce a given constant value of gain in amplifier stage 33.

By means of the coupling condenser 60, the output of amplifier 33 is applied to the control grid of a triode 61, making up the error-signal amplifier 40. Triode 61 is similarly supplied with plate voltage through the resistor 53 and the load resistor 62, with a decoupling condenser 63 forming a low-impedance path to ground. A resistor 64 forms the grid return circuit, while a cathode resistor 65 furnishes the required bias. Also connected to the grid of triode 61 is the balancing-potential lead 34 which includes a resistor 66.

By means of the coupling condenser 70, the output of amplifying stage 40 is applied to the demodulating circuit 41 through an input transformer 71 having a center-tapped secondary. The ends of the secondary winding are respectively connected to the anodes of a pair of diode-connected triodes 72 and 73, the cathodes of which are connected by a pair of equal resistors 74 and 75 in series. In order to make demodulator 41 sensitive to phase, an alternating-current reference voltage taken from generator 10 through a transformer 76 is applied between the center tap of input transformer 71 and the mid-point of series resistors 74 and 75. Depending upon the relative phase of the voltages supplied through transformers 71 and 76, half-wave rectified direct-current voltage pulses of positive or negative polarity appear across the series combination of resistors 74 and 75. Some filtering for this voltage is provided by a pair of condensers 79 and 80 connected respectively from the cathode ends of resistors 74 and 75 to ground.

The pulsating direct-current voltage thus obtained, which reverses with the phase of the error signal, is applied to a voltage-amplification stage of the amplifier 42 having the triodes 81 and 82 connected in push-pull relationship and provided with grid input resistors 83 and 84, respectively, and a common cathode-bias resistor 85. Voltage is supplied to the plates of triodes 81 and 82 from a suitable source through load resistors 86 and 87. Simultaneously, the direct-current signal from demodulator 41 is applied to the grids of a second pair of push-pull-connected triodes 91 and 92 provided with plate voltage through the load resistors 93 and 94 and having a common cathode-bias resistor 95.

Through resistors 96 and 97, the plate of triode 81 is directly coupled to the grid of a power tube 98, while the plate of triode 91 is connected by a condenser 99 and the resistor 97 to this grid. The plate of triode 82 is similarly coupled through resistors 100 and 101 to the grid of a second power tube 102 connected in push-pull relationship with tube 98. Corresponding to the connection of triode 91, the plate of triode 92 is coupled through a condenser 103 and the resistor 101 to the grid of tube 102. Tubes 98 and 102 are provided with the respective grid input resistors 104 and 105 shunted by small condensers 106 and 107. Bias is supplied by a common cathode resistor 108. Plate voltage is supplied to the anodes of tubes 98 and 102 from a suitable high voltage source through the armature of the servo-motor 43 and the respective halves 110 and 111 of the split series field of this servo-motor. Screen voltage for the power output tubes 98 and 102 is supplied through a common resistor 112.

Although it is believed that the operation of this system can be understood from the foregoing description, it may be briefly explained as follows: As long as the two voltages applied to the grid of tube 61 are equal and opposite in phase, the currents flowing in field windings 110 and 111 are similarly equal and opposite, and there is no motion of servo-motor 43 and potentiometer slider 38. When these voltages are unequal, a direct-current potential proportional in amplitude and of a polarity depending on the phase of the difference voltage appears at the demodulator output. This is amplified by the two push-pull voltage amplifier stages which operate in parallel. Triodes 81 and 82 form an amplifier stage direct-coupled to the power stage, which comprises the tubes 98 and 102, while the coupling of triodes 91 and 92 by condensers results in a signal proportional to the derivative or rate of change of the demodulator output being applied to the power stage. The effect of this derivative voltage is to provide a type of damping to the system which, if it is adjusted to the so-called "critical" value, prevents hunting or oscillation. As a result, the amplitude and phase of the varying alternating current signal applied to the channel input leads 30 and 31 are reproduced rapidly and accurately in the position of slider 38 and of pen 20 or 27.

Figure 4:
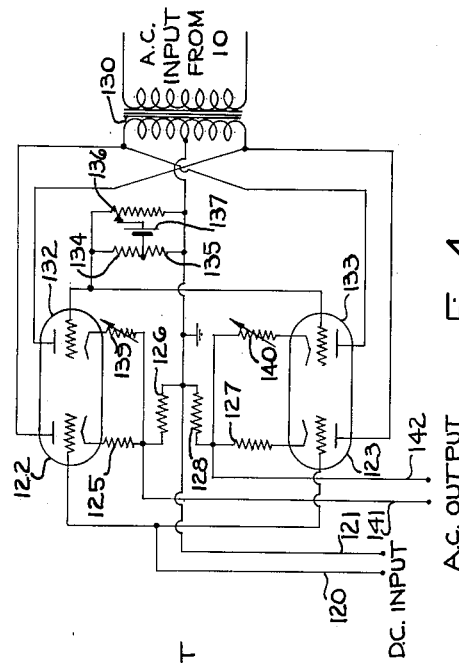
Figure 4 is a detailed circuit diagram of the preferred means for converting the direct-current spontaneous potential to an alternating-current voltage suitable for recording.

In Figure 4 is shown a circuit diagram of the preferred means for converting the small direct-current spontaneous potentials to alternating potentials for recording by the system just described. By the modulator or converter input leads 120 and 121, the direct-current voltage is applied in parallel to the grids and cathodes of a pair of triodes 122 and 123. Between the cathode of triode 122 and ground are the two series resistors 125 and 126 and, similarly, between ground and the cathode of triode 123 the series resistors 127 and 128 are connected. An alternating potential is applied to the plates of triodes 122 and 123 from the alternating-current generator 10 through a transformer 130, of which the center tap of the secondary is connected to the common or ground point between cathode resistors 126 and 128. An alternating-current output signal for application to the recorder channel 26 is taken across the cathode resistors 126 and 128 in series by the leads 141 and 142.

With the circuit thus far described, an alternating-current output is obtained which varies with the direct-current input voltage but does not become zero when the input is zero. Accordingly, a compensating voltage drop is provided by a second pair of triodes 132 and 133 provided with an adjustable constant bias voltage from a bridge network formed by resistors 134 and 135 in series between the grids of triodes 132 and 133 and ground, resistors 134 and 135 being in parallel with a potentiometer 136. The voltage of a battery 137 is applied to the slider of potentiometer 136 and the mid-point of resistors 134 and 135. Adjustment of this slider applies a direct-current voltage of any desired magnitude and polarity between the two grids and ground. Triodes 132 and 133 have the cathode-bias resistors 126 and 128 in common with triodes 122 and 123, while additional adjustable cathode bias is applied respectively to the triodes 132 and 133 by the variable resistors 139 and 140, respectively in series with the common bias resistors 126 and 128. Plate voltage is supplied from transformer 130 to triodes 132 and 133 equal to but 180° out of phase with that respectively supplied to triodes 122 and 123 by reversed connections to the terminals of the transformer secondary.

The adjustment and operation of this inverter circuit is as follows: Each of the triodes 122 and 123 passes current during that portion of the alternating-current cycle when its plate is positive. This results in half cycle pulses of current alternately through the resistors 126 and 128 of an amplitude varying with the direct-current input voltage applied to the grids by leads 120 and 121. Considering the half cycle when triode 122 is conducting, for example, a voltage pulse appears across cathode resistor 126. Simultaneously, due to the reversed connection to transformer 130, the plate of triode 133 is positive, and there is a pulse of voltage across the cathode resistor 128 of opposite polarity to the pulse across resistor 126. During this half cycle triodes 123 and 132 are non-conducting because of the negative voltage applied to their plates. It will be apparent that there is a combination of fixed and self bias obtainable by proper adjustment of potentiometer 136 and of the variable cathode resistor 140, so that the voltage pulses across resistors 126 and 128 will exactly cancel each other, producing no output across the alternating-current output terminals 141 and 142. Similarly, adjustment of cathode resistor 139 will bring about cancellation of the pulses across resistors 128 and 126 on the other half cycle, when triodes 123 and 132 become conducting, and triodes 122 and 133 are cut off. Since all of the triodes have substantially identical plate-current characteristic curves, the wave form of the pulses appearing across the cathode resistors will be substantially identical. It is, therefore, possible to adjust this circuit to produce substantially zero alternating-current output for zero direct-current input voltage. Application of a positive direct-current input voltage results in a pulse amplitude of the current passing through triodes 122 and 123 larger than are the pulses of compensating current supplied triodes 132 and 133. There is thus a net alternating-current voltage output appearing across the leads 141 and 142 of amplitude strictly proportional to the direct-current input.

When the direct-current input voltage is negative, the situation is reversed in that the current pulses supplied by the compensating triodes 132 and 133 are larger than the signal pulses of the triodes 122 and 123. This gives an alternating-current output of proportional magnitude but opposite phase.

Figure 5:
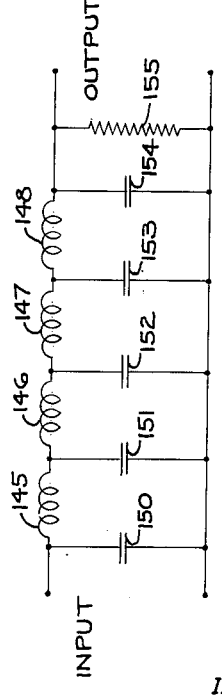
Figure 5 is a circuit diagram of a typical filter for separating the direct and alternating-current voltages.

In Figure 5 is shown a representative low-pass filter 28 which may be employed ahead of the inverter 25 to exclude alternating-current voltages and pass substantially only direct-current voltages to the inverter input. This filter is of a well known type comprising a plurality of series inductances 145, 146, 147, and 148, with shunting condensers 150, 151, 152, 153, and 154. The filter is terminated by a shunting resistance 155.

A fairly wide variety of choices and values for electrical circuit components will be apparent to those skilled in amplifier design. However, representative values for the circuit elements of this system, identified by reference numerals, might be as follows:

Condensers

| | Mfd. |
|---|---|
| 106, 107 | .001 |
| 51, 99, 103 | .01 |
| 79, 80 | .02 |
| 60, 70 | .1 |
| 150, 154 | 1.5 |
| 151, 152, 153 | 3.0 |
| 56, 63 | 8.0 |

Resistors

| | | |
|---|---|---|
| 95, 125, 127 | ohms | 500 |
| 65, 85, 108, 134, 135, 136, 139, 140 | do | 1,000 |
| 126, 128 | do | 2,000 |
| 53, 58 | do | 5,000 |
| 57 | do | 6,000 |
| 112 | do | 10,000 |
| 155 | do | 17,000 |
| 39 | do | 20,000 |
| 37, 62 | do | 50,000 |
| 54 | do | 100,000 |
| 55, 97, 101 | do | 250,000 |
| 86, 87, 93, 94 | do | 500,000 |
| 64, 66, 74, 75, 83, 84, 96, 100, 104, 105 | megohm | 1 |

Tubes

| | |
|---|---|
| 52, 61 | One, type 6SL7GT |
| 72, 73 | One, type 6SL7GT |
| 81, 82 | One, type 6SL7GT |
| 91, 92 | One, type 6SL7GT |
| 98, 102 | Two, type 6L6 |
| 122, 132 | Two, type 6SL7GT |
| 123, 133 | One, type 6SL7GT |

Transformers

| | |
|---|---|
| 71, 76 | Hollytran, type 699F37 |
| 130 | Hollytran, type 699EF37 |
| 36 | Hollytran, type 800F37 |
| 50 | Hollytran, type 1503EF53 |

Potentiometers

| | |
|---|---|
| 37, 39 | General radio type 371—A |

Inductances

| | |
|---|---|
| 145, 146, 147, 148 | 500 henrys |

While our invention has been described in detail by reference to the foregoing specific embodiment, it is to be understood that a number of modifications will be apparent to those skilled in the art. The invention, therefore, should not be considered as limited to the specific details set forth, but is to be defined by the scope of the appended claims.

We claim:

1. An inverter comprising a pair of vacuum tubes each having at least one anode, cathode, and control grid, means for applying a direct-current signal voltage simultaneously and in the same polarity to the control grids of both of said tubes, a cathode bias resistor connected between the cathode of each of said tubes and ground, an alternating voltage source connected between the anode of each of said tubes and ground, the voltages applied to the respective anodes being equal and opposite in phase whereby signal current pulses of an amplitude proportional to said signal voltage occur alternately in the cathode bias resistors of said tubes, means for passing, alternately through said cathode bias resistors and out of phase with said signal current pulses, compensating current pulses equal in amplitude to said signal current pulses when said signal voltage is zero, and leads coupled to said cathode bias resistors for deriving an output voltage proportional to the difference between said signal current pulses and said compensating current pulses.

2. An inverter comprising a first pair of vacuum tubes each having at least one anode, cathode, and control grid, means for applying a direct-current signal voltage simultaneously and in the same polarity to the control grids of both of said tubes, a pair of cathode bias resistors each connected between the cathode of one of said tubes and ground, a pair of equal alternating voltage sources of opposite phase each connected between the anode of one of said tubes and ground, whereby signal current pulses of an amplitude proportional to said signal voltage occur alternately in the cathode bias resistors of said tubes, a second pair of vacuum tubes having characteristics substantially identical to those of said first pair, means for applying a constant voltage simultaneously to the control grids of said second pair of tubes, the cathode of each of said second pair of tubes being connected to ground through the cathode bias resistor of one of said first pair of tubes, and the anode of each of said second pair of tubes being coupled to one of said alternating voltage sources whereby constant-amplitude current pulses occur alternately in said cathode resistors, the phase of the anode voltages of said first and second pair of vacuum tubes being such that said signal current pulses and said constant-amplitude current pulses occur simultaneously in opposite ones of said cathode bias resistors, and leads coupled to said cathode bias resistors for deriving an output voltage proportional to the difference between said signal current pulses and said constant-amplitude current pulses.

JOSEPH D. EISLER.
RALPH E. HARTLINE.

REFERENCES CITED

The following references are of record in the file of this patent:

UNITED STATES PATENTS

| Number | Name | Date |
| --- | --- | --- |
| 2,179,265 | Luck | Nov. 7, 1939 |
| 2,382,608 | Dale | Aug. 14, 1945 |
| 2,406,856 | Satterlee | Sept. 3, 1946 |
| 2,425,909 | Shepherd | Aug. 5, 1947 |
| 2,426,497 | Field | Aug. 26, 1947 |
| 2,436,503 | Cleveland | Feb. 24, 1948 |
| 2,478,203 | McCoy | Aug. 9, 1949 |